United States Patent
Dong et al.

(10) Patent No.: US 12,055,804 B2
(45) Date of Patent: Aug. 6, 2024

(54) DISPLAY DEVICE, BACKLIGHT SOURCE, AND AUTOMOBILE

(71) Applicant: TIANMA MICROELECTRONICS CO., LTD., Shenzhen (CN)

(72) Inventors: Qiang Dong, Shenzhen (CN); Xiaoping Sun, Shenzhen (CN); Qiongqin Mao, Shenzhen (CN)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 302 days.

(21) Appl. No.: 17/717,525

(22) Filed: Apr. 11, 2022

(65) Prior Publication Data
US 2022/0236595 A1 Jul. 28, 2022

(30) Foreign Application Priority Data
Dec. 31, 2021 (CN) .......................... 202111668245.8

(51) Int. Cl.
*G02F 1/13* (2006.01)
*B60K 35/00* (2024.01)
(Continued)

(52) U.S. Cl.
CPC ............ *G02F 1/1323* (2013.01); *B60K 35/00* (2013.01); *G02B 6/0036* (2013.01);
(Continued)

(58) Field of Classification Search
CPC ................ G02F 1/1323; G02F 1/13306; G02F 1/13338; G02F 1/134309; G02F 2202/04; G02F 1/133626; G02F 1/13737; G02F 1/133615; B60K 35/00; B60K 35/10; B60K 35/22; B60K 2360/1434; B60K 2360/336; B60K 2360/1526; G02B 6/0036;
(Continued)

(56) References Cited

U.S. PATENT DOCUMENTS

2003/0001809 A1* 1/2003 Hattori .................. G02F 1/1395
345/87
2017/0219859 A1* 8/2017 Christophy ............... G02F 1/29
(Continued)

FOREIGN PATENT DOCUMENTS

CN 107342063 A 11/2017
CN 110264967 A 9/2019
(Continued)

*Primary Examiner* — Md Saiful A Siddiqui
(74) *Attorney, Agent, or Firm* — KDW Firm PLLC

(57) ABSTRACT

Provided are a display device, a backlight source, and an automobile. The display device includes a view angle control panel; in a sharing mode phase, a same voltage is provided for the first electrode and the second electrode; in a privacy mode phase, a first voltage is provided for the first electrode, and an alternating voltage signal is provided for the second electrode, where a high voltage of the alternating voltage signal is greater than the first voltage, and a low voltage of the alternating voltage signal is less than the first voltage; in a transition phase, the first voltage is provided for the first electrode, and a voltage signal with gradually changing duty cycles is provided for the second electrode; where the transition phase is located between the sharing mode phase and the privacy mode phase.

19 Claims, 13 Drawing Sheets

(51) Int. Cl.
*F21V 8/00* (2006.01)
*G02F 1/133* (2006.01)
*G02F 1/1333* (2006.01)
*G02F 1/1343* (2006.01)
*B60K 35/10* (2024.01)
*B60K 35/22* (2024.01)

(52) U.S. Cl.
CPC ......... *G02B 6/0068* (2013.01); *G02B 6/0076* (2013.01); *G02F 1/13306* (2013.01); *G02F 1/13338* (2013.01); *G02F 1/134309* (2013.01); *B60K 35/10* (2024.01); *B60K 35/22* (2024.01); *B60K 2360/1434* (2024.01); *B60K 2360/336* (2024.01); *G02F 2202/04* (2013.01)

(58) Field of Classification Search
CPC ....... G02B 6/0068; G02B 6/0076; G09F 9/33; G09G 3/3696
See application file for complete search history.

(56) References Cited

U.S. PATENT DOCUMENTS

| | | | |
|---|---|---|---|
| 2020/0050033 A1* | 2/2020 | Galwaduge | G02F 1/1685 |
| 2022/0229320 A1* | 7/2022 | Dong | G02F 1/134309 |
| 2023/0205029 A1* | 6/2023 | Song | G02F 1/1681 |

FOREIGN PATENT DOCUMENTS

| | | |
|---|---|---|
| CN | 111176016 A | 5/2020 |
| CN | 111656271 A | 9/2020 |
| JP | 2008216615 A | 9/2008 |

\* cited by examiner

First direction

First direction

DISPLAY DEVICE, BACKLIGHT SOURCE, AND AUTOMOBILE

CROSS-REFERENCE TO RELATED APPLICATION(S)

This application claims priority to Chinese Patent Application No. 202111668245.8 filed with the China National Intellectual Property Administration (CNIPA) on Dec. 31, 2021, the disclosure of which is incorporated herein by reference in its entirety.

TECHNICAL FIELD

The present disclosure relates to the field of display technologies, in particular to a display device, a backlight source and an automobile.

BACKGROUND

At present, people have different requirements for view angles of display products in different occasions. For example, when the content of a display picture may be seen by many people at different angles, the display product is required to have a wide view angle, namely a sharing state; and when the content of the display picture is kept secret and is visible only by a user himself/herself, the display product is required to have a narrow-view-angle function, namely a peep-proof state.

During the switch between the sharing state and the peep-proof state, the change of the brightness which may be distinguished by human eyes occurs, so that the human eyes can recognize a switching process of the sharing state and the peep-proof state, and thus the human eyes are prone to fatigue.

SUMMARY

The present disclosure provides a display device, a backlight source and an automobile, to gradually change the brightness at each view angle and avoid the abrupt change of the display brightness of the display device during the switch between a sharing mode phase and a privacy mode phase, so that the fatigue of human eyes is improved.

In a first aspect, an embodiment of the present disclosure provides a display device. The display device includes a view angle control panel, where the view angle control panel includes a view angle liquid crystal layer, a first electrode and a second electrode; the view angle liquid crystal layer includes a liquid crystal molecule, and the liquid crystal molecule is driven to rotate by an electric field generated between the first electrode and the second electrode. In a sharing mode phase, a same voltage is provided for the first electrode and the second electrode. In a privacy mode phase, a first voltage is provided for the first electrode, and an alternating voltage signal is provided for the second electrode, where a high voltage of the alternating voltage signal is greater than the first voltage, and a low voltage of the alternating voltage signal is less than the first voltage. In a transition phase, the first voltage is provided for the first electrode, and a voltage signal with gradually changing duty cycles is provided for the second electrode; where the transition phase is located between the sharing mode phase and the privacy mode phase, and a duty cycle is a ratio of a time duration occupied by a pulse to a continuous operating time period, and the time duration occupied by the pulse is located within the continuous operating time period and includes: a first time duration and a second time duration, wherein in the first time duration, a voltage of the pulse is the high voltage of the alternating voltage signal, and in the second time duration, the voltage of the pulse is the low voltage of the alternating voltage signal.

In a second aspect, an embodiment of the present disclosure provides a backlight source. The backlight source includes a first light source and a second light source; in a sharing mode phase, the second light source is turned on; in a privacy mode phase, the first light source is turned on, and the second light source is turned off; and in a transition phase, a voltage signal with gradually changing duty cycles is provided for the second light source, where the transition phase is located between the sharing mode phase and the privacy mode phase, and a duty cycle is a ratio of a time duration occupied by a pulse to a continuous operating time period, and the time duration occupied by the pulse is located within the continuous operating time period and includes: a first time duration and a second time duration, wherein in the first time duration, a voltage of the pulse is a high voltage of an alternating voltage signal, and in the second time duration, the voltage of the pulse is a low voltage of the alternating voltage signal.

In a third aspect, an embodiment of the present disclosure provides a display device. The display device includes the backlight source described in the second aspect and a liquid crystal display panel, where the liquid crystal display panel is disposed on a light-emitting side of the backlight source.

In a fourth aspect, an embodiment of the present disclosure provides an automobile. The automobile includes the display device described in the first aspect, or the display device described in the third aspect.

In the display device provided in the embodiments of the present disclosure, the transition phase is additionally set between the sharing mode phase and the privacy mode phase, and in the transition phase, the first voltage is provided for the first electrode, and the voltage signal with the gradually changing duty cycles is provided for the second electrode. Thus, an electric field with gradually changed intensities is generated between the first electrode and the second electrode, and the liquid crystal molecule is driven to gradually rotate, so as to gradually change the brightness at each view angle and avoid the abrupt change of the display brightness of the display device during the switch between the sharing mode phase (namely, the sharing state) and the privacy mode phase (namely, the peep-proof state). Therefore, the fatigue of the human eyes is improved.

DETAILED DESCRIPTION

Figure 1:
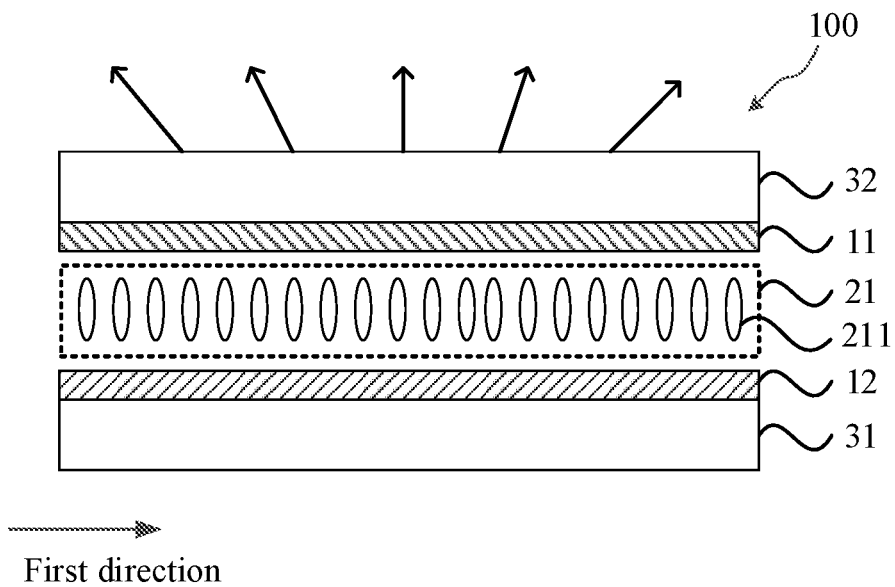
FIG. 1 is a schematic diagram of a display device in a sharing mode phase according to an embodiment of the present disclosure.

The present disclosure will be further described in detail in conjunction with the drawings and embodiments below. It should be understood that the specific embodiments described herein are merely used for explaining the present disclosure and are not intended to limit the present disclosure. It should also be noted that, for ease of description, only part, but not all, of the structures related to the present disclosure are shown in the drawings.

Figure 2:
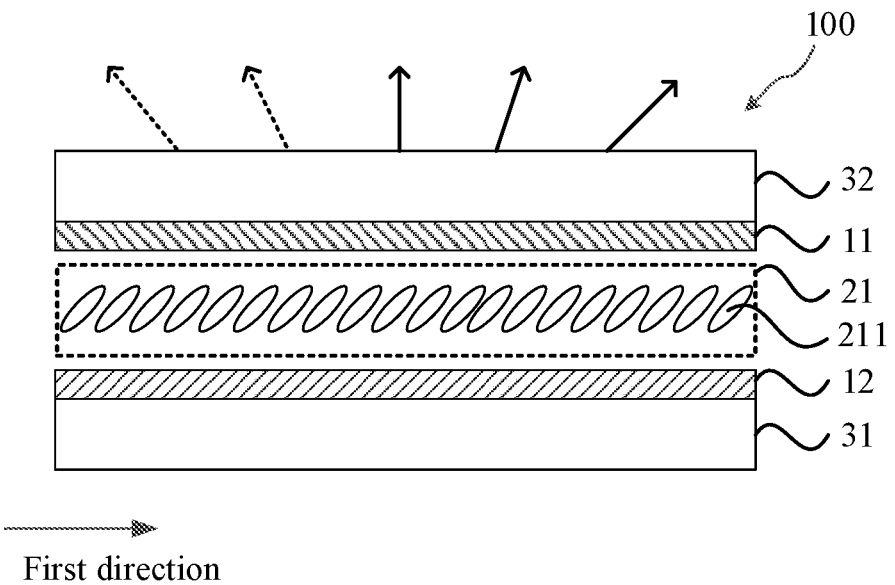
FIG. 2 is a schematic diagram of the display device shown in FIG. 1 in a privacy mode phase.
Figure 3:
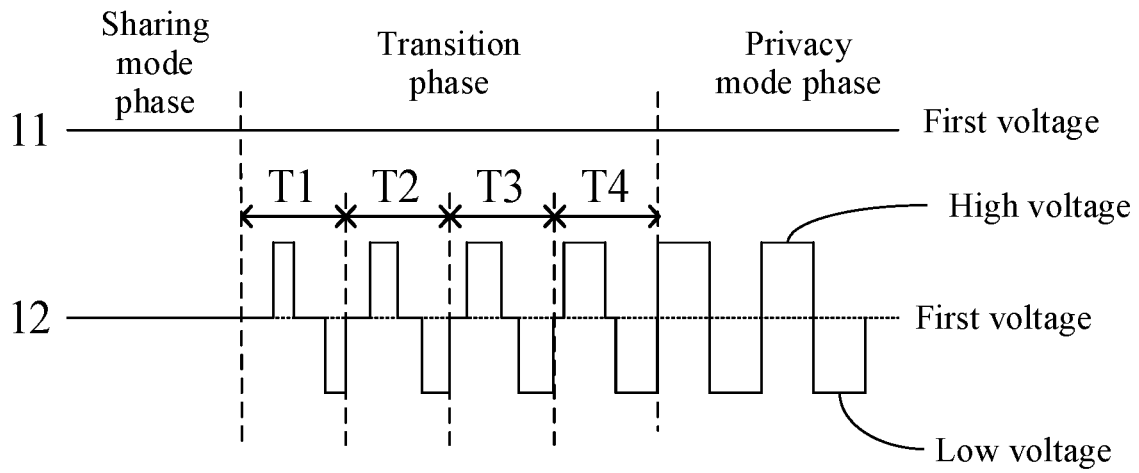
FIG. 3 is a timing diagram of a display device according to an embodiment of the present disclosure.

FIG. 1 is a schematic diagram of a display device in a sharing mode phase according to an embodiment of the present disclosure, FIG. 2 is a schematic diagram of the display device shown in FIG. 1 in a privacy mode phase, and FIG. 3 is a timing diagram of a display device according to an embodiment of the present disclosure. With reference to FIGS. 1 to 3, the display device includes a view angle control panel 100, and the view angle control panel 100 includes a view angle liquid crystal layer 21, a first electrode 11 and a second electrode 12. The view angle liquid crystal layer 21 includes liquid crystal molecules 211. The liquid crystal molecules 211 are driven to rotate by an electric field generated between the first electrode 11 and the second electrode 12.

In the sharing mode phase, a same voltage is provided for the first electrode 11 and the second electrode 12. For example, a first voltage is provided for both the first electrode 11 and the second electrode 12, no electric field is formed between the first electrode 11 and the second electrode 12, and the liquid crystal molecules 211 do not rotate. The emitting brightness of the light at each view angle is the same or approximate, and the case where the brightness of the light at a certain view angle range is rapidly reduced does not occur. A picture displayed by the display device may be viewed by human eyes at various view angles.

In the privacy mode phase, the first voltage is provided for the first electrode 11, and an alternating voltage signal is provided for the second electrode 12, where a high voltage of the alternating voltage signal is greater than the first voltage, and a low voltage of the alternating voltage signal is less than the first voltage. An electric field is generated between the first electrode 11 and the second electrode 12 to drive the liquid crystal molecules 211 to rotate, causing that the light brightness of the display device on a first side is rapidly reduced, and a picture displayed by the display device cannot be viewed by human eyes on the first side. The light brightness of the display device on a second side is not reduced or slightly reduced, and a picture displayed by the display device may be viewed by human eyes on the second side. The first side is opposite to the second side. For example, the first side may be the left side, and the second side is the right side. The alternating voltage signal is a voltage signal which fluctuates up and down around a common, and in one waveform period, the alternating voltage signal has a high voltage which is greater than the first voltage and a low voltage which is less than the first voltage. In multiple waveform periods, there are high voltage, low voltage, high voltage, low voltage and so on in sequence. That is, adjacent high voltages are spaced by one low voltage, and adjacent low voltages are spaced by one high voltage. The first voltage may be a common voltage (0V), a positive voltage, or a negative voltage. In some implementations, a voltage provided for the first electrode 11 in the privacy mode phase may also be different from a voltage provided for the first electrode 11 in the sharing mode phase.

In the transition phase, the first voltage is provided for the first electrode 11, and a voltage signal with gradually changing duty cycles is provided for the second electrode 12. The transition phase is located between the sharing mode phase and the privacy mode phase, and a and a duty cycle is a ratio of a time duration occupied by a pulse to a continuous operating time period, and the time duration occupied by the pulse is located within the continuous operating time period and includes: a first time duration and a second time duration, wherein in the first time duration, a voltage of the pulse is the high voltage of the alternating voltage signal, and in the second time duration, the voltage of the pulse is the low voltage of the alternating voltage signal. The voltage signal with the gradually changing duty cycles may be the alternating voltage signal.

In the display device provided in the embodiments of the present disclosure, the transition phase is additionally set between the sharing mode phase and the privacy mode phase, and in the transition phase, the first voltage is provided for the first electrode 11, and the voltage signal with the gradually changing duty cycles is provided for the second electrode 12, so that an electric field with gradually changing intensities is generated between the first electrode 11 and the second electrode 12, and the liquid crystal molecules 211 are driven to gradually rotate. Therefore, the brightness at each view angle is gradually changed, and the abrupt change of the display brightness of the display device during the switch between the sharing mode phase (namely, a sharing state) and the privacy mode phase (namely, a peep-proof state) is avoided, and thus the fatigue of the human eyes is improved.

As shown in FIG. 3, there are differences in timing waveforms of the sharing mode phase, the transition phase, and the privacy mode phase, causing the view angle differences in display brightness of the display device. In an actual display device product, the sharing mode phase, the transition phase, and the privacy mode phase may be achieved by the control of the voltage applied to the second electrode 12. In the sharing mode phase, the first voltage is provided for the second electrode 12. In the transition phase, the voltage provided for the second electrode 12 includes the high voltage, the low voltage and the first voltage, and a gradual change of the duty cycle is achieved by controlling a ratio of the high voltage in the waveform period and a ratio of the low voltage in the waveform period. In the privacy mode phase, the high voltage and the low voltage are provided for the second electrode 12, the pulses occupy all of the waveform period and the duty cycle is 100%.

In an embodiment, with reference to FIG. 3, in the transition phase during which the sharing mode phase is switched to the privacy mode phase, a voltage signal with gradually increasing duty cycles is provided for the second electrode 12. In the sharing mode phase, the first voltage is provided for the second electrode 12, no pulses exist, and the duty cycle is 0%. In the transition phase, a voltage signal with gradually increasing duty cycles is provided for the second electrode 12. For example, a voltage signal with a duty cycle of 20%, 40%, 60%, and 80% in sequence is provided. In the privacy mode phase, a signal with a duty cycle of 100% is provided for the second electrode 12. Therefore, during the change from the sharing mode phase to the transition phase and then from the transition phase to the privacy mode phase, duty cycles of signals provided for the second electrode 12 gradually increase, a gradually enhanced electric field is generated between the first electrode 11 and the second electrode 12, and the liquid crystal molecules 211 are driven to gradually rotate, so that the view angle is gradually narrowed, and the abrupt change of the display brightness of the display device is avoided, and thus the fatigue of the human eyes is improved.

Exemplarily, the duration of each waveform period is equal, i.e., each waveform period has the same length of time. Multiple waveform periods of the transition phase are sequentially denoted as a first period T1, a second period T2, a third period T3 and a fourth period T4. A duty cycle of the first period T1 is less than a duty cycle of the second period T2. The duty cycle of the second period T2 is less than a duty cycle of the third period T3, and the duty cycle of the third period T3 is less than a duty cycle of the fourth period T4.

Figure 4:
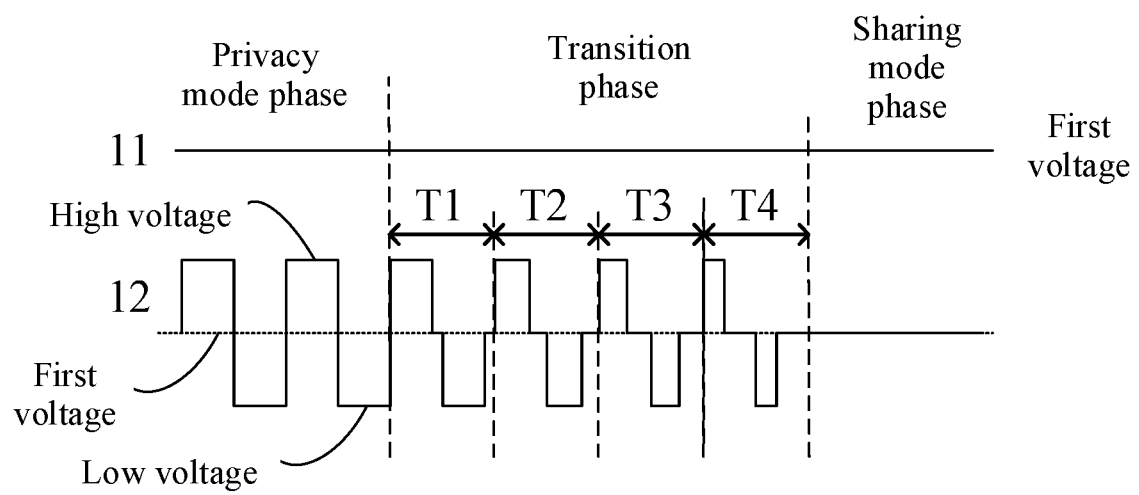
FIG. 4 is a timing diagram of another display device according to an embodiment of the present disclosure.

FIG. 4 is a timing diagram of another display device according to an embodiment of the present disclosure. With reference to FIG. 4, in the transition phase during which the privacy mode phase is switched to the sharing mode phase, a voltage signal with gradually decreasing duty cycles is provided for the second electrode 12. In the privacy mode phase, a signal with a duty cycle of 100% is provided for the second electrode 12. In the transition phase, a voltage signal with gradually decreasing duty cycles is provided for the second electrode 12. For example, a voltage signal with a duty cycle of 80%, 60%, 40%, and 20% in sequence is provided. In the sharing mode phase, a signal with a duty cycle of 0% is provided for the second electrode 12. Therefore, during the change from the privacy mode phase to the transition phase and then from the transition phase to the sharing mode phase, duty cycles of signals provided for the second electrode 12 gradually decrease, and a gradually weakened electric field is generated between the first electrode 11 and the second electrode 12, and the liquid crystal molecules 211 are driven to gradually rotate, so that the view angle is gradually broaden, and the abrupt change of the display brightness of the display device is avoided, and thus the fatigue of the human eyes is improved.

Exemplarily, the duty cycle of the first period T1 is greater than the duty cycle of the second period T2. The duty cycle of the second period T2 is greater than the duty cycle of the third period T3. The duty cycle of the third period T3 is greater than the duty cycle of the fourth period T4.

It should be noted that the voltage signal with the gradually changing duty cycles is a voltage signal with gradually increasing or decreasing duty cycles as a whole. At least two adjacent waveform periods may have the same duty cycle.

Figure 5:
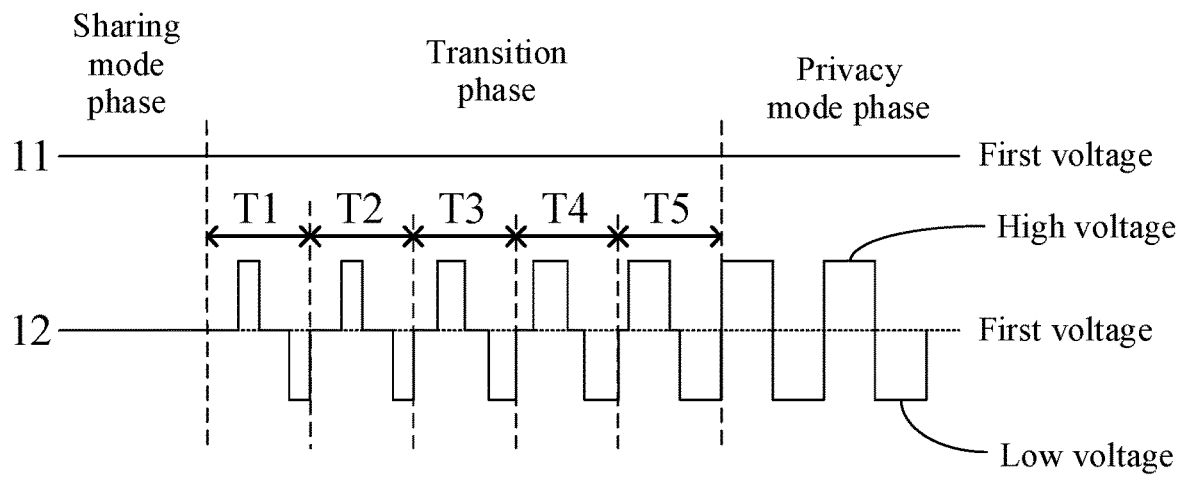
FIG. 5 is a timing diagram of another display device according to an embodiment of the present disclosure.

FIG. 5 is a timing diagram of another display device according to an embodiment of the present disclosure. With reference to FIG. 5, multiple waveform periods of the transition phase are sequentially denoted as a first period T1, a second period T2, a third period T3, a fourth period T4, and a fifth period T5. A duty cycle of the first period T1 is equal to a duty cycle of the second period T2. The duty cycle of the second period T2 is less than a duty cycle of the third period T3. The duty cycle of the third period T3 is less than a duty cycle of the fourth period T4. The duty cycle of the fourth period T4 is less than a duty cycle of the fifth period T5.

In an implementation, multiple waveform periods may constitute a group, waveform periods within a same group have the same duty cycle, and waveform periods within different groups have different duty cycles.

Figure 6:
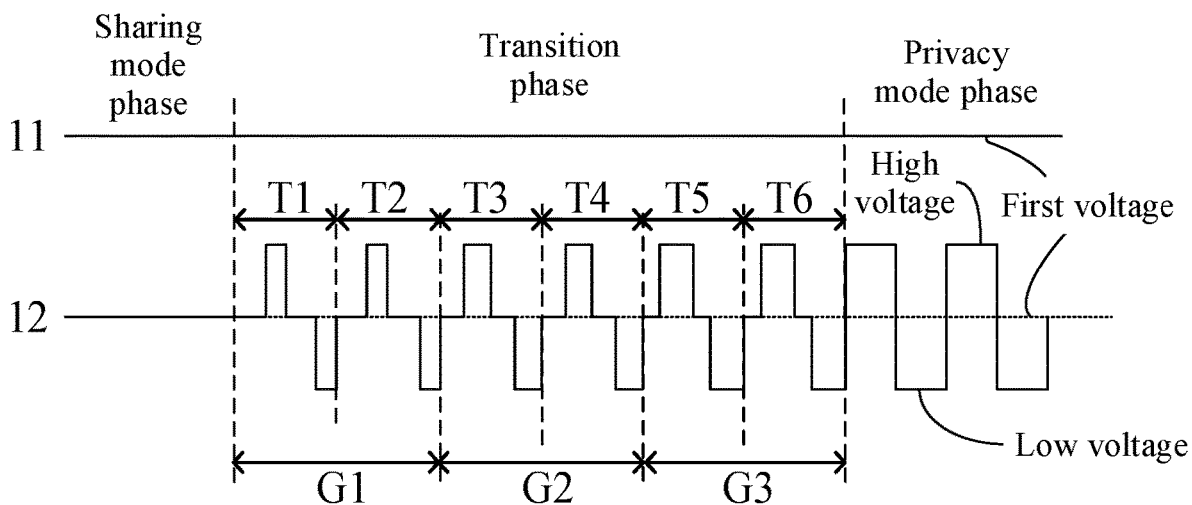
FIG. 6 is a timing diagram of another display device according to an embodiment of the present disclosure.

FIG. 6 is a timing diagram of another display device according to an embodiment of the present disclosure. With reference to FIG. 6, multiple groups of the transition phase are sequentially denoted as a first group G1, a second group G2, and a third group G3. The first group G1 includes a first period T1 and a second period T2 set in sequence. The second group G2 includes a third period T3 and a fourth period T4 set in sequence. The third group G3 includes a fifth period T5 and a sixth period T6 set in sequence. A duty cycle of the first period T1 is equal to a duty cycle of the second period T2, a duty cycle of the third period T3 is equal to a duty cycle of the fourth period T4, and a duty cycle of the fifth period T5 is equal to a duty cycle of the sixth period T6. The duty cycle of the second period T2 is less than the duty cycle of the third period T3. The duty cycle of the fourth period T4 is less than the duty cycle of the fifth period T5.

In an embodiment, with reference to FIGS. 3 to 6, in the transition phase, a square wave signal with gradually changing duty cycles is provided for the second electrode 12. In other implementations, voltage signals with other waveforms may also be provided for the second electrode 12 in the transition phase.

Figure 7:
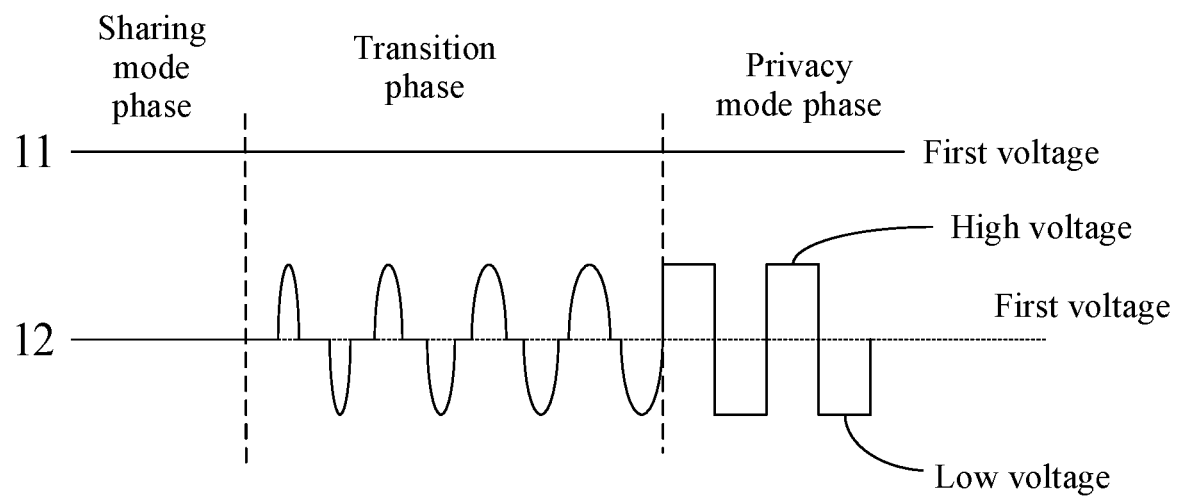
FIG. 7 is a timing diagram of another display device according to an embodiment of the present disclosure.

FIG. 7 is a timing diagram of another display device according to an embodiment of the present disclosure. With reference to FIG. 7, in the transition phase, the waveform provided for the second electrode 12 includes a curve.

Referring to FIGS. 3 to 6, in the transition phase or the privacy mode phase, alternating high and low voltages are provided for the second electrode 12, and thus it is avoided that the drive voltage of the liquid crystal molecules 211 is fixed at a certain fixed value. Further, a maintaining duration of the high voltage is equal to a maintaining duration of the low voltage in a same waveform period, and a rotation angle of the liquid crystal molecules 211 driven by an electric field generated by the high voltage and the first voltage is equal to a rotation angle of the liquid crystal molecules 211 driven by an electric field generated by the low voltage and the first voltage, but directions of the liquid crystal molecules 211 are opposite, so that the polarization of the liquid crystal molecules 211 is avoided.

Figure 8:
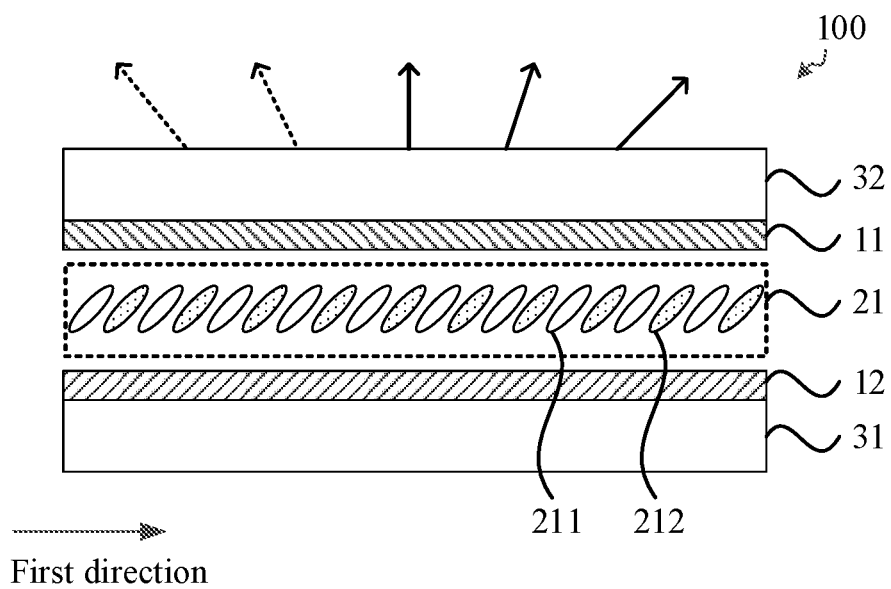
FIG. 8 is a cross-sectional view of another display device according to an embodiment of the present disclosure.

FIG. 8 is a cross-sectional view of another display device according to an embodiment of the present disclosure. With reference to FIG. 8, the view angle liquid crystal layer 21 includes liquid crystal molecules 211 and dye molecules 212. When an electric field generated between the first electrode 11 and the second electrode 12 drives the liquid crystal molecules 211 to rotate, the dye molecules 212 are driven to rotate, that is, the dye molecules 212 rotate according to the rotation of the liquid crystal molecules 211. The light whose polarization direction is parallel to a long axis direction of the dye molecules 212 is absorbed by the dye molecules 212, and the light whose polarization direction is perpendicular to the long axis direction of the dye molecules 212 is not absorbed by the dye molecules 212.

As shown in FIG. 8, the electric field generated between the first electrode 11 and the second electrode 12 drives the liquid crystal molecules 211 to rotate, the polarization direction of the light emitted toward the left side is parallel or approximately parallel to the long axis direction of the dye molecules 212, and the light is absorbed by the dye molecules 212, so that a picture displayed by the display device cannot be viewed by the human eyes on the left side. The polarization direction of the light emitted toward the right side is perpendicular or approximately perpendicular to the long axis direction of the dye molecules 212, and the light is not absorbed by the dye molecules 212, so that a picture displayed by the display device may be viewed by the human eyes on the right side.

Figure 9:
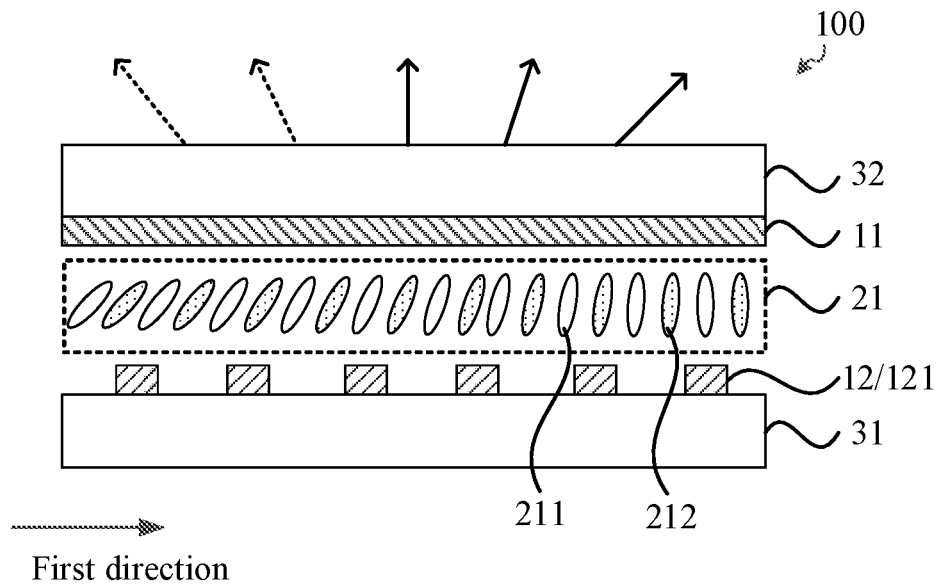
FIG. 9 is a cross-sectional view of another display device according to an embodiment of the present disclosure.

FIG. 9 is a cross-sectional view of another display device according to an embodiment of the present disclosure. With reference to FIG. 9, the second electrode 12 includes multiple sub-electrodes 121 arranged in an array. The view angle control panel 100 further includes a voltage gradient conversion circuit (not shown in FIG. 9), and the voltage gradient conversion circuit is configured to provide a voltage signal with a reduced gradient for multiple sub-electrodes 121 arranged in a first direction. For the multiple sub-electrodes 121 arranged in the first direction, an electric field generated between the sub-electrodes 121 and the first electrode 11 gradually decreases, so that the rotation angle of the liquid crystal molecules 211 gradually decreases in the first direction. The light emitted toward the left side is absorbed by the dye molecules 212. The light emitted toward the right side is not absorbed by the dye molecules 212. The voltage applied to the sub-electrode 121 on the right side is less than the voltage applied to the sub-electrode 121 on the left side, which reduces the power consumption of the display device.

Figure 10:
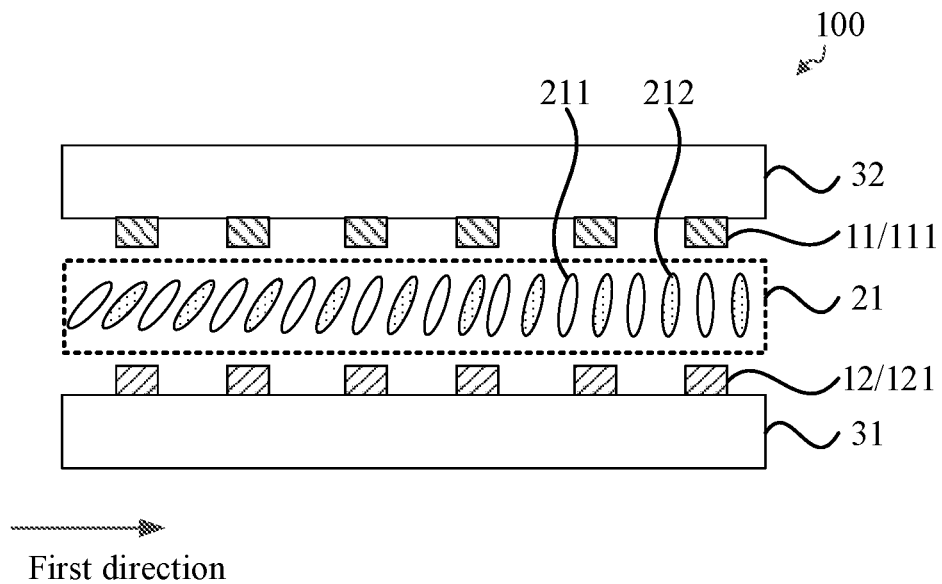
FIG. 10 is a cross-sectional view of another display device according to an embodiment of the present disclosure.

FIG. 10 is a cross-sectional view of another display device according to an embodiment of the present disclosure. With reference to FIG. 10, the first electrode 11 includes multiple counter sub-electrodes 111, and the counter sub-electrodes 111 are disposed opposite to the sub-electrodes 121. When the first voltage is provided for the first electrode 11, the first voltage is provided for all the counter sub-electrodes 111 at the same time.

Figure 11:
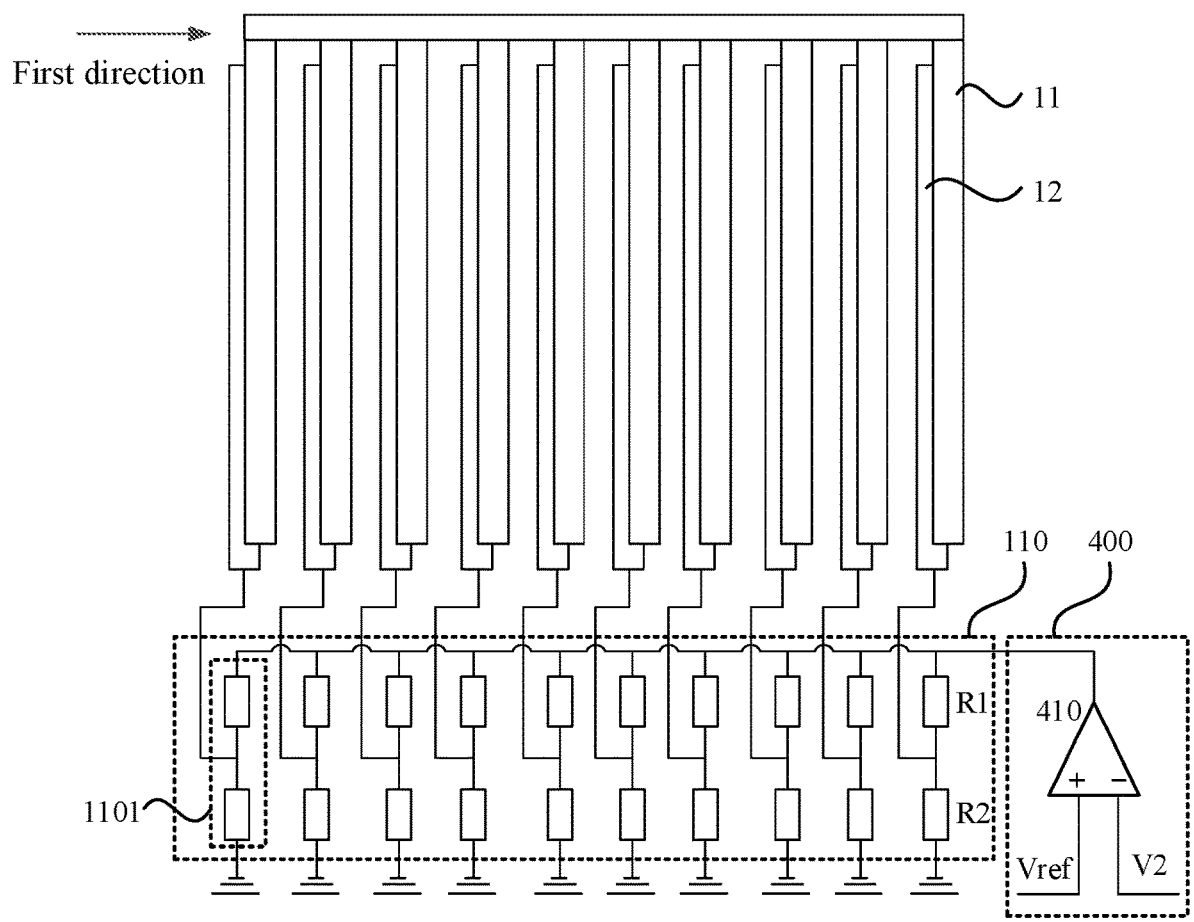
FIG. 11 is a top view of another display device according to an embodiment of the present disclosure.
Figure 12:
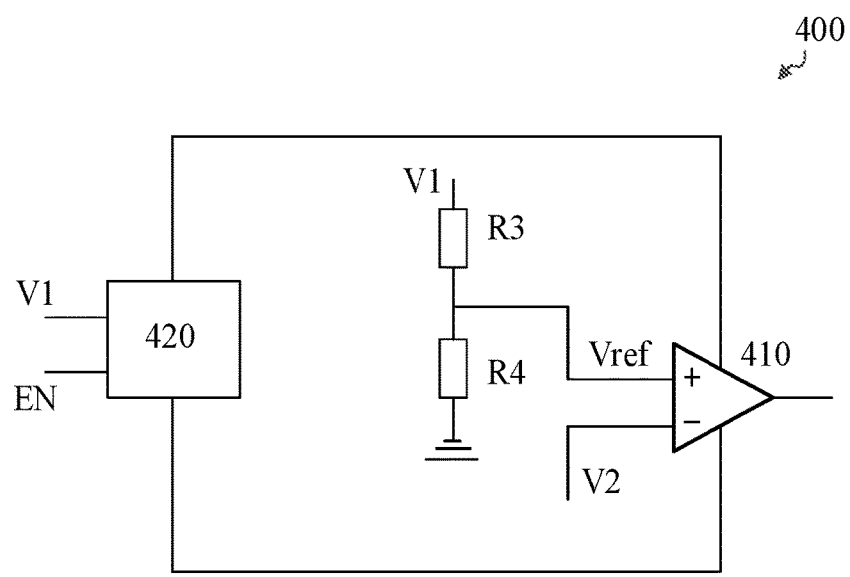
FIG. 12 is a circuit schematic diagram of a driver circuit according to an embodiment of the present disclosure.
Figure 13:
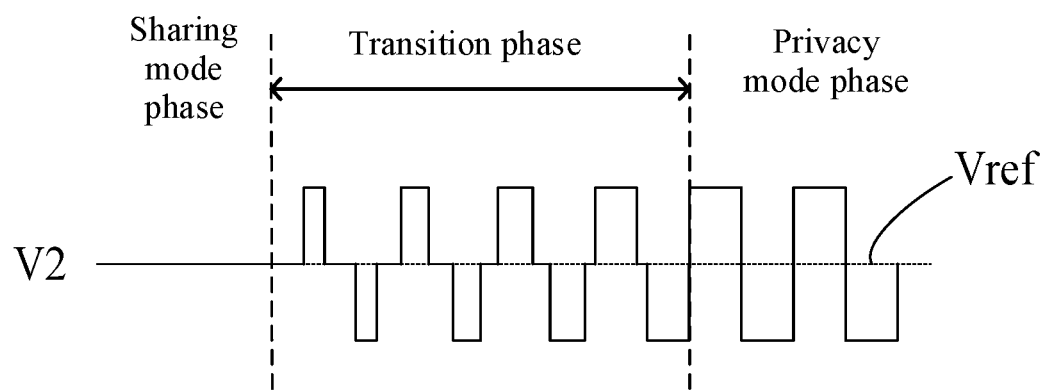
FIG. 13 is a timing diagram of a voltage signal alternating around a reference voltage according to an embodiment of the present disclosure.

FIG. 11 is a top view of another display device according to an embodiment of the present disclosure, FIG. 12 is a circuit schematic diagram of a driver circuit according to an embodiment of the present disclosure, and FIG. 13 is a timing diagram of a voltage signal alternating around a reference voltage according to an embodiment of the present disclosure. With reference to FIGS. 11, 12 and 13, the display device further includes a driver circuit 400. The driver circuit 400 includes a comparator 410, a non-inverting input terminal of the comparator 410 is configured to input a reference voltage Vref, and a voltage signal input by an inverting input terminal of the comparator 410 is configured to alternate around the reference voltage Vref, and an output terminal of the comparator 410 is configured to output a voltage signal with gradually changing duty cycles in the transition phase In FIG. 11, in order to illustrate the overlapping first electrode 11 and second electrode 12, the first electrode 11 and the second electrode 12 are staggered at a certain interval in the first direction. In an actual display device, the first electrode 11 and the second electrode 12 may be staggered at a certain interval in the first direction, or may overlap with each other without being staggered in the first direction. Referring to FIGS. 11 to 13, the view angle control panel 100 further includes a voltage gradient conversion circuit 110, the output terminal of the comparator 410 may be electrically connected to the voltage gradient conversion circuit 110, and a voltage signal output by the output terminal of the comparator 410 is processed by the voltage gradient conversion circuit 110 and then applied to multiple sub-electrodes 121 arranged in an array. In the transition phase, a voltage signal with gradually changing duty cycles is applied to each sub-electrode 121. Exemplarily, with reference to FIG. 11, the voltage gradient conversion circuit 110 includes multiple voltage regulating units 1101, a first terminal of the voltage regulating unit 1101 is electrically connected to the output terminal of the comparator 410, a second terminal of the voltage regulating unit 1101 is connected to ground, and an output terminal of the voltage regulating unit 1101 is electrically connected to the second electrode 12, so that the voltage of the second electrode 12 electrically connected to the voltage regulating unit 1101 can be regulated by the voltage regulating unit 1101.

Exemplarily, with reference to FIG. 11, the voltage regulating unit 1101 includes a first resistor R1 and a second resistor R2, a first terminal of the first resistor R1 is electrically connected to the output terminal of the comparator 410, a second terminal of the first resistor R1 is electrically connected to a first terminal of the second resistor R2, and a second terminal of the second resistor R2 is connected to ground. The second terminal of the first resistor R1 is electrically connected to the second electrode 12, so that a voltage provided by the second electrode 12 can be changed by regulating resistance values of the first resistor R1 and the second resistor R2.

In another implementation, the output terminal of the comparator 410 may be directly electrically connected to the second electrode 12 to apply a voltage signal with gradually changing duty cycles to the second electrode 12 in the transition phase.

Exemplarily, with reference to FIGS. 11, 12 and 13, the driver circuit 400 includes a bias voltage providing device 420, a third resistor R3 and a fourth resistor R4, an input terminal of the bias voltage providing device 420 is electrically connected to a first power supply terminal V1, and a control terminal of the bias voltage providing device 420 is electrically connected to an enable terminal EN. A first output terminal of the bias voltage providing device 420 is electrically connected to a first power input terminal of the comparator 410 for providing a positive bias voltage for the comparator 410. A second output terminal of the bias voltage providing device 420 is electrically connected to a second power supply input terminal of the comparator 410 for providing a negative bias voltage for the comparator 410. A first terminal of the third resistor R3 is electrically connected to the first power supply terminal V1, a second terminal of the third resistor R3 is electrically connected to a first terminal of the fourth resistor R4, and a second terminal of the fourth resistor R4 is connected to ground. The second terminal of the third resistor R3 is electrically connected to a non-inverting input terminal of the comparator 410, and a resistor string formed by the third resistor R3 and the fourth resistor R4 is configured to provide a reference voltage Vref. An inverting input terminal of the comparator 410 is electrically connected to the second power supply terminal V2. In an implementation, the second power supply terminal V2 may be electrically connected to a driver chip, i.e., a voltage signal is provided for the inverting input terminal of the comparator 410 via the driver chip.

Figure 14:
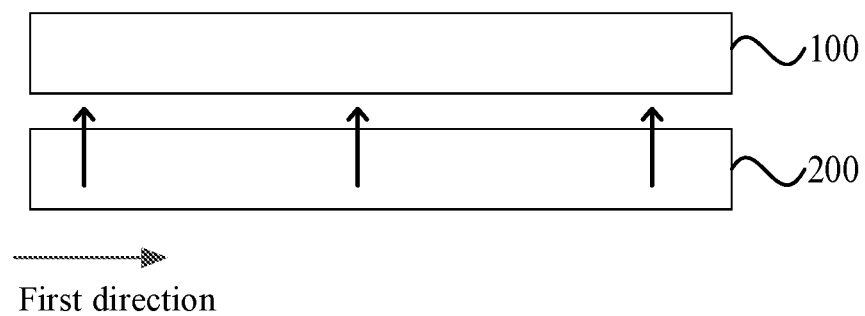
FIG. 14 is a cross-sectional view of another display device according to an embodiment of the present disclosure.

FIG. 14 is a cross-sectional view of another display device according to an embodiment of the present disclosure. With reference to FIG. 14, the display device includes a view angle control panel 100 and a display panel 200, and the view angle control panel 100 is disposed on a light-emitting display side of the display panel 200. The light emitted by the display panel 200 irradiates on the view angle control panel 100, and the brightness of the light at each view angle is changed by the view angle control panel 100, so that the privacy mode phase, the transition phase and the sharing mode phase are achieved.

In an embodiment, the display panel includes a display panel known in the art, such as a liquid crystal display panel, an organic light-emitting display panel, or a micro light-emitting diode display panel. The organic light-emitting display panel and the micro light-emitting diode display panel are self-light-emitting display panels that do not need a backlight source, so that the display device is lighter and thinner. The organic light-emitting display panel includes an organic light-emitting material layer, and the organic light-emitting display panel may further include at least one of a hole injection layer, a hole transport layer, an electron blocking layer, a hole blocking layer, an electron transport layer, or an electron injection layer. The micro light-emitting diode display panel includes a micro light-emitting diode (i.e., u LED), and the micro light-emitting diode has the advantages of smaller size, higher reaction speed, higher light-emitting efficiency, stronger stability, longer service life and the like.

Figure 15:
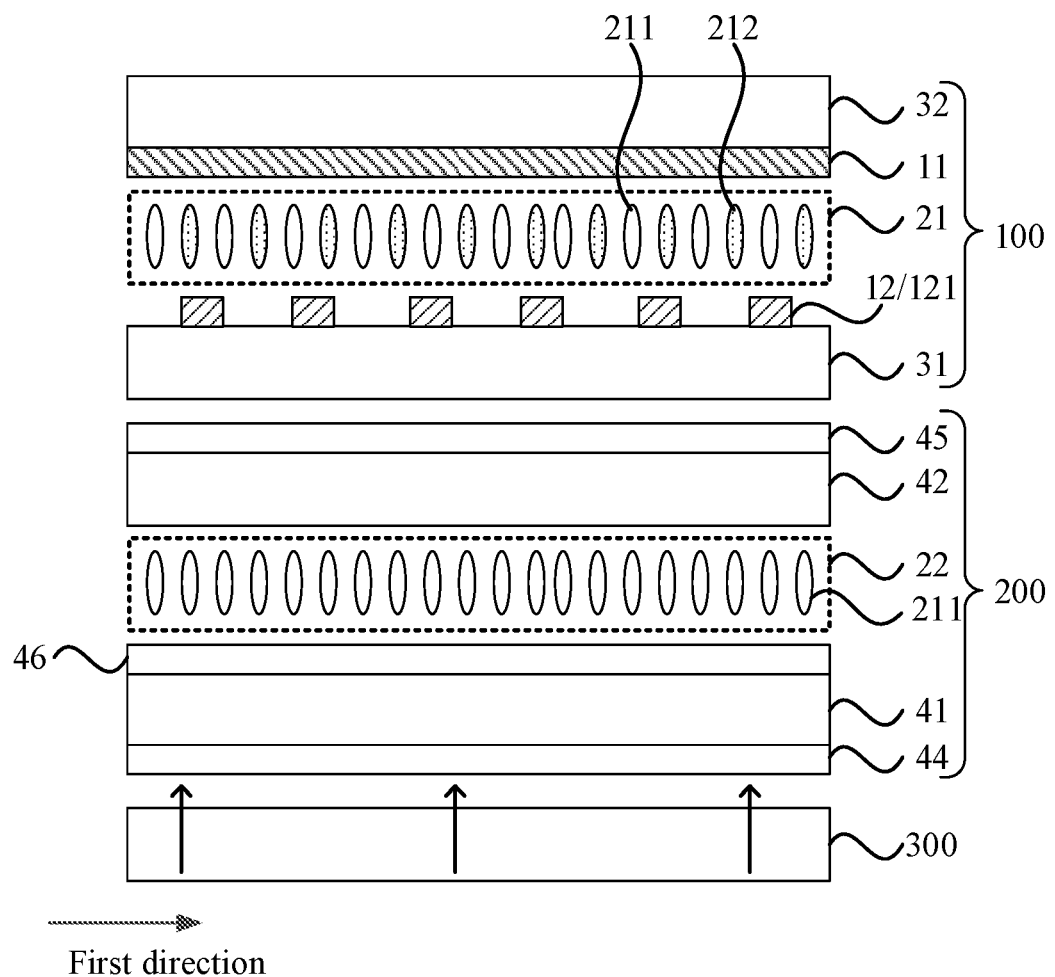
FIG. 15 is a cross-sectional view of another display device according to an embodiment of the present disclosure.

FIG. 15 is a cross-sectional view of another display device according to an embodiment of the present disclosure. With reference to FIG. 15, the display device includes a view angle control panel 100, a display panel 200 and a backlight source 300, the display panel 200 is a liquid crystal display panel, and the backlight source 300 is configured to provide the backlight. The display panel 200 is disposed between the view angle control panel 100 and the backlight source 300, the light emitted by the backlight source 300 penetrates through the display panel 200 and then irradiates on the view angle control panel 100, and the brightness of the light at each view angle is changed by the view angle control panel 100, so that the privacy mode phase, the transition phase and the sharing mode phase are achieved.

Figure 16:
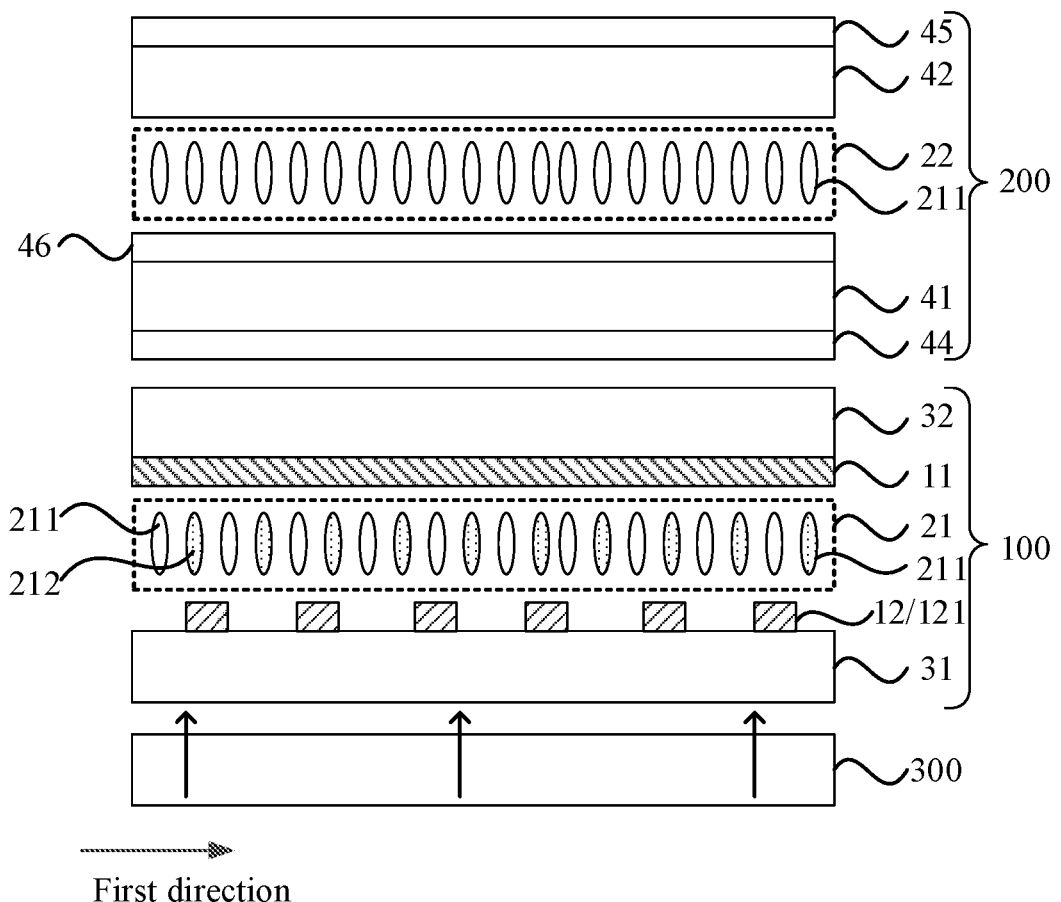
FIG. 16 is a cross-sectional view of another display device according to an embodiment of the present disclosure.

FIG. 16 is a cross-sectional view of another display device according to an embodiment of the present disclosure. With reference to FIG. 16, the view angle control panel 100 is disposed between the display panel 200 and the backlight source 300. The light emitted by the backlight source 300 irradiates on the view angle control panel 100, the brightness of the light at each view angle is changed by the view angle control panel 100, and then the light irradiates on the display panel 200, so that the privacy mode phase, the transition phase and the sharing mode phase are achieved.

Exemplarily, referring to FIG. 16, the view angle control panel 100 further includes a first view angle substrate 31 and a second view angle substrate 32. The first electrode 11, the second electrode 12, and the view angle liquid crystal layer 21 are all disposed between the first view angle substrate 31 and the second view angle substrate 32.

Exemplarily, referring to FIG. 16, the display panel 200 includes a first display substrate 41, a second display substrate 42, and a display liquid crystal layer 22. The display liquid crystal layer 22 is disposed between the first display substrate 41 and the second display substrate 42. The display liquid crystal layer 22 includes multiple liquid crystal molecules 211 and the liquid crystal molecules 211 rotate under the drive of an electric field generated by a pixel electrode (not shown in FIG. 16) and a common electrode (not shown in FIG. 16). The display panel 200 may further include a first polarizer 44 and a second polarizer 45, and the first polarizer 44 is disposed on a side of the first display substrate 41 away from the display liquid crystal layer 22. The second polarizer 45 is disposed on a side of the second display substrate 42 away from the display liquid crystal layer 22. A polarization direction of the first polarizer 44 may be perpendicular or parallel to a polarization direction of the second polarizer 45.

In an embodiment, the display device further includes a touch plate 46, and when the display panel 200 is disposed on a side of the view angle control panel 100 away from the backlight source 300, the touch plate 46 may also be disposed between the first display substrate 41 and the second display substrate 42, i.e., the touch plate 46 is integrated into the display panel 200, so that the thickness of the display device is thinned. In an embodiment, the touch plate 46 may also be disposed on a side of the second polarizer 45 away from the view angle control panel 100, and in this case, the touch plate 46 includes a substrate and a touch electrode disposed on the substrate. It should be noted that when the touch plate 46 is disposed within a box of the display panel 200, the touch plate 46 includes only touch electrode, and no additional base substrate is provided, and the touch electrode of the touch electrode is disposed on a side of the base substrate of the display panel 200 facing the liquid crystals.

In the above implementations, the view angle control panel has a view angle control function and is configured to control the brightness of the light emitted by the display panel at a specific view angle or control the brightness of the light emitted by the backlight source at a specific view angle, but does not have a display function. In another implementation, the view angle control panel may also have the display function, so that there is no need to additionally provide a display panel for the view angle control panel.

Figure 17:
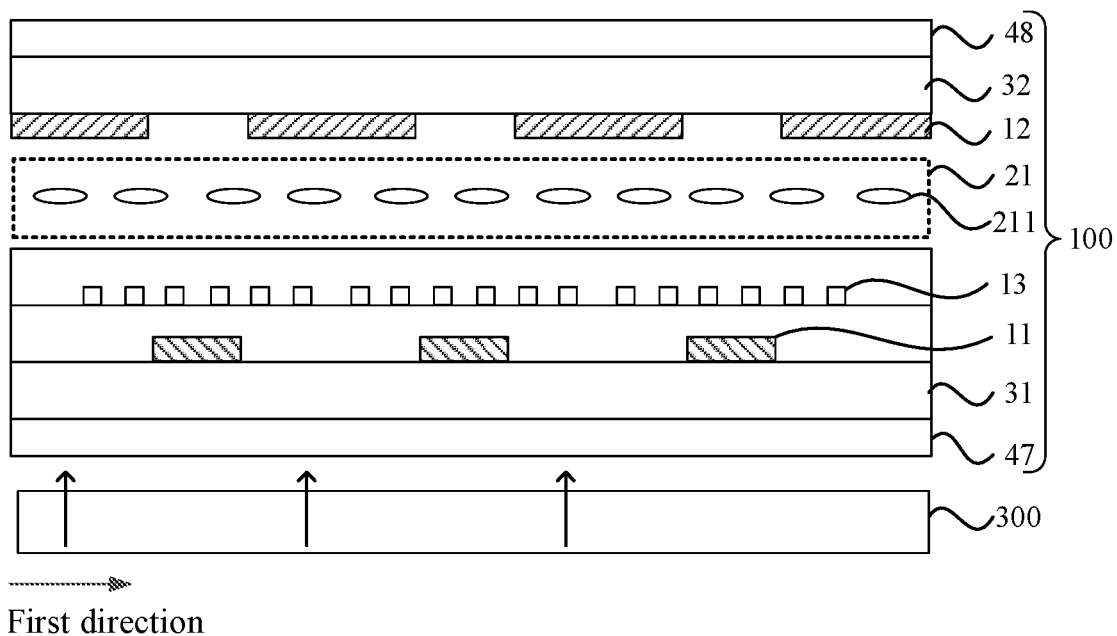
FIG. 17 is a cross-sectional view of another display device according to an embodiment of the present disclosure.

FIG. 17 is a cross-sectional view of another display device according to an embodiment of the present disclosure. With reference to FIG. 17, the view angle control panel 100 further includes a pixel electrode 13. The first electrode 11 and the second electrode 12 are disposed on opposite two sides of the view angle liquid crystal layer 21, and the first electrode 11 and the pixel electrode 13 are disposed on a same side of the view angle liquid crystal layer 21.

Exemplarily, in the sharing mode phase, the first voltage may be applied to the first electrode 11, the first voltage may be applied to the second electrode 12, and a corresponding gray-scale voltage may be applied to each pixel electrode 13, so that the wide-view-angle display is achieved. In the privacy mode phase, the first voltage may be applied to the first electrode 11, alternating voltages of 3.5V and −3.5V may be applied to the second electrode 12, and a corresponding gray-scale voltage may be applied to each sub-pixel electrode 13, so that the narrow-view-angle display may be achieved. The first voltage may be a common voltage (0V), a positive voltage, or a negative voltage.

Exemplarily, the display device further includes a third polarizer 47 and a fourth polarizer 48, and the third polarizer 47 is disposed on a side of the first view angle substrate 31 away from the view angle liquid crystal layer 21. The fourth polarizer 48 is disposed on a side of the second view angle substrate 32 away from the view angle liquid crystal layer 21. A polarization direction of the third polarizer 47 may be perpendicular or parallel to a polarization direction of the fourth polarizer 48.

Figure 18:
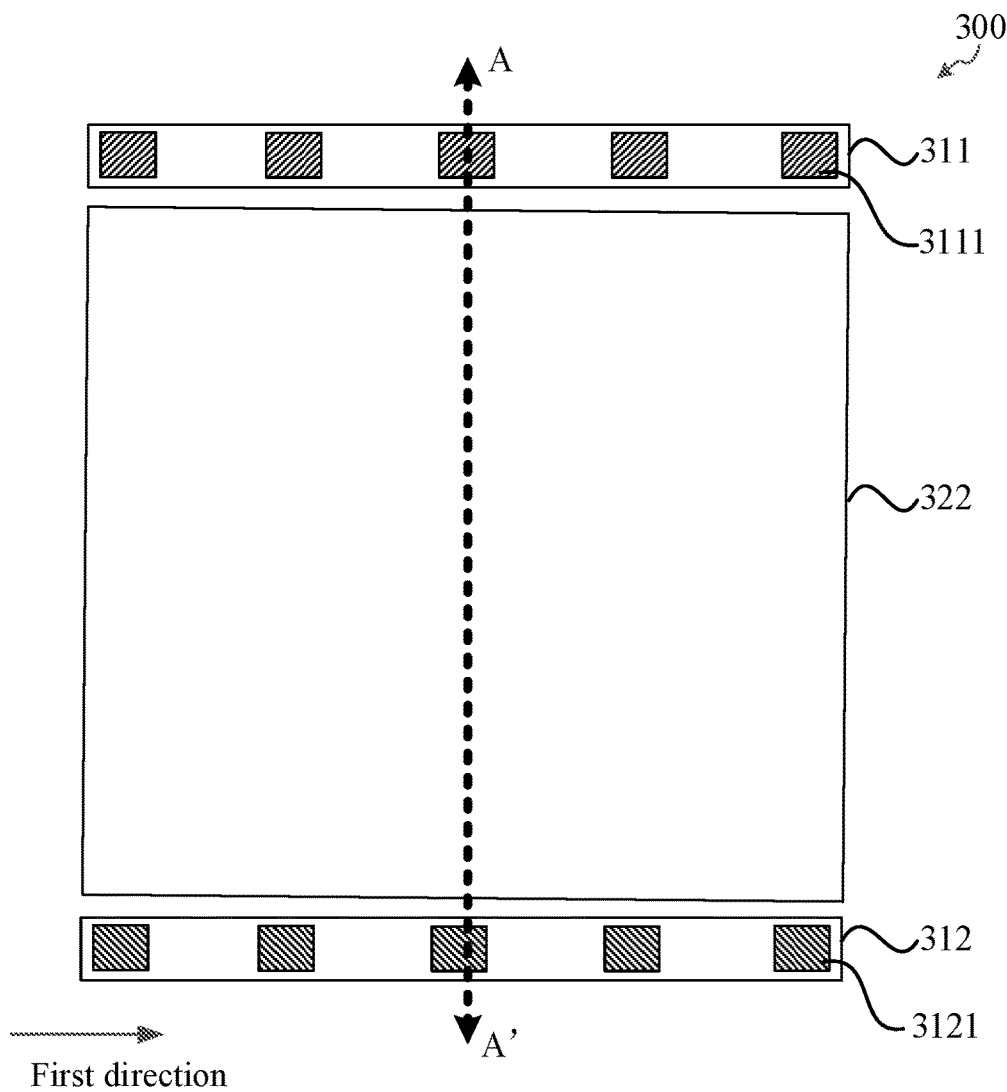
FIG. 18 is a top view of a backlight source according to an embodiment of the present disclosure.
Figure 19:
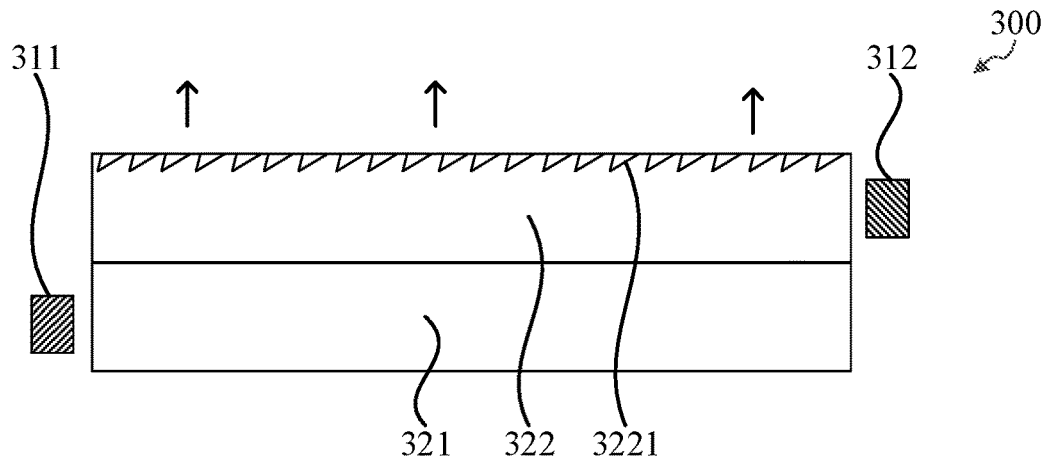
FIG. 19 is a cross-sectional view taken along AA' of FIG. 18.
Figure 20:
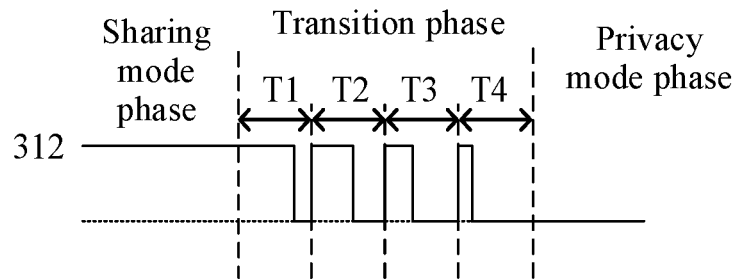
FIG. 20 is a timing diagram of a backlight source according to an embodiment of the present disclosure.

FIG. 18 is a top view of a backlight source according to an embodiment of the present disclosure, FIG. 19 is a cross-sectional view taken along AA' of FIG. 18, and FIG. 20 is a timing diagram of a backlight source according to an embodiment of the present disclosure. The backlight source 300 includes a first light source 311 and a second light source 312. In the sharing mode phase, the second light source 312 is turned on. In the privacy mode phase, the first light source 311 is turned on and the second light source 312 is turned off. In the transition phase, a voltage signal with gradually changing duty cycles is provided for the second light source 312. The transition phase is located between the sharing mode phase and the privacy mode phase, and the duty cycle is a ratio of a time duration occupied by a pulse to a continuous operating time period, and the time duration occupied by the pulse is located within the continuous operating time period and includes: a first time duration and a second time duration, wherein in the first time duration, a voltage of the pulse is a high voltage of an alternating voltage signal, and in the second time duration, the voltage of the pulse is a low voltage of the alternating voltage signal.

An embodiment of the present disclosure provides a backlight source, and the backlight source may be used in the display device of the above embodiments. During the change from the sharing mode phase to the privacy mode phase, the second light source 312 changes from on to off. During the change from the privacy mode phase to the sharing mode phase, the second light source 312 changes from off to on. The transition phase is additionally set between the sharing mode phase and the privacy mode phase, and in the transition phase, a voltage signal with gradually changing duty cycles is provided for the second light source 312, so that the luminance of the second light source 312 is gradually changed, and the abrupt change of the backlight brightness of the backlight source during the switch between the sharing mode phase (namely, a sharing state) and the privacy mode phase (namely, a peep-proof state) is avoided, and thus the fatigue of the human eyes is improved.

In an embodiment, referring to FIG. 20, in the transition phase during which the sharing mode phase is switched to the privacy mode phase, a voltage signal with gradually decreasing duty cycles is provided for the second light source 312. In the sharing mode phase, a drive voltage is provided for the second light source 312 and a duty cycle is 100%. In the transition phase, a voltage signal with gradually decreasing duty cycles is provided for the second light source 312. For example, a voltage signal with a duty cycle of 80%, 60%, 40%, and 20% in sequence is provided. In the privacy mode phase, no drive voltage is provided for the second light source 312 and a duty cycle is 0%. Therefore, during the change from the sharing mode phase to the transition phase and then from the transition phase to the privacy mode phase, duty cycles of signals provided for the second electrode 12 gradually decrease, and the luminance of the second light source 312 gradually decreases, so that the abrupt change of the backlight brightness of the backlight source is avoided, and thus the fatigue of the human eyes is improved.

Figure 21:
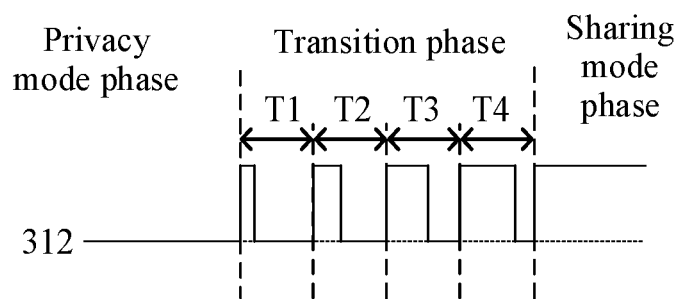
FIG. 21 is a timing diagram of another backlight source according to an embodiment of the present disclosure.

FIG. 21 is a timing diagram of another backlight source according to an embodiment of the present disclosure. With reference to FIG. 21, in the transition phase during which the privacy mode phase is switched to the sharing mode phase, a voltage signal with gradually increasing duty cycles is provided for the second light source 312. In the privacy mode phase, no drive voltage is provided for the second light source 312 and a duty cycle is 0%. In the transition phase, a voltage signal with gradually increasing duty cycles is provided for the second light source 312. For example, a voltage signal with a duty cycle of 20%, 40%, 60%, and 80% in sequence is provided. In the sharing mode phase, a drive voltage with a duty cycle of 100% is provided for the second light source 312. Therefore, during the change from the privacy mode phase to the transition phase and then from the transition phase to the sharing mode phase, duty cycles of signals provided for the second electrode 12 gradually increase, and the luminance of the second light source 312 gradually increases, so that the abrupt change of the backlight brightness of the backlight source is avoided, and thus the fatigue of the human eyes is improved.

Figure 22:
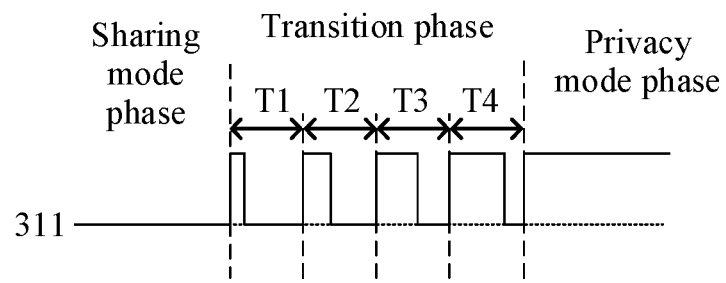
FIG. 22 is a timing diagram of another backlight source according to an embodiment of the present disclosure.

FIG. 22 is a timing diagram of another backlight source according to an embodiment of the present disclosure. With reference to FIGS. 18, 19, and 22, the first light source 311 is turned off in the sharing mode phase. In the transition phase, a voltage signal with gradually changing duty cycles is provided for the first light source 311. In the embodiments of the present disclosure, during the change from the sharing mode phase to the privacy mode phase, the first light source 311 is changed from off to on. During the change from the privacy mode phase to the sharing mode phase, the first light source 311 changes from on to off. In the transition phase, a voltage signal with gradually changing duty cycles is provided for the first light source 311, so that the luminance of the first light source 311 is gradually changed, the abrupt change of the backlight brightness of the backlight source during the switch between the sharing mode phase (namely, a sharing state) and the privacy mode phase (namely, a peep-proof state) is avoided, and thus the fatigue of the human eyes is improved.

In an embodiment, referring to FIG. 22, in the transition phase during which the sharing mode phase is switched to the privacy mode phase, a voltage signal with gradually increasing duty cycles is provided for the first light source 311. In the sharing mode phase, no drive voltage is provided for the first light source 311 and a duty cycle is 0%. In the transition phase, a voltage signal with gradually increasing duty cycles is provided for the first light source 311. For example, a voltage signal with a duty cycle of 20%, 40%, 60%, and 80% in sequence is provided. In the privacy mode phase, a drive voltage with a duty cycle of 100% is provided for the first light source 311. Therefore, during the change from the sharing mode phase to the transition phase and then from the transition phase to the privacy mode phase, duty cycles of signals provided for the first light source 311 gradually increase, and the luminance of the first light source 311 gradually increases, so that the abrupt change of the backlight brightness of the backlight source is avoided, and thus the fatigue of the human eyes is improved.

Figure 23:
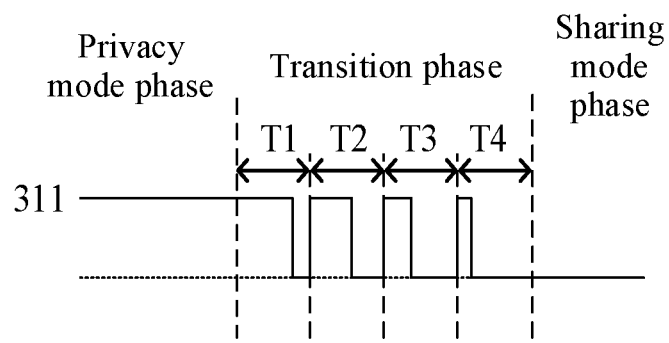
FIG. 23 is a timing diagram of another backlight source according to an embodiment of the present disclosure.

FIG. 23 is a timing diagram of another backlight source according to an embodiment of the present disclosure. With reference to FIG. 23, in the transition phase during which the privacy mode phase is switched to the sharing mode phase, a voltage signal with gradually decreasing duty cycles is provided for the first light source 311. In the privacy mode phase, a drive voltage with a duty cycle of 100% is provided for the first light source 311. In the transition phase, a voltage signal with gradually decreasing duty cycles is provided for the first light source 311. For example, a voltage signal with a duty cycle of 80%, 60%, 40%, and 20% in sequence is provided. In the sharing mode phase, no drive voltage is provided for the first light source 311 and a duty cycle is 0%. Therefore, during the change from the privacy mode phase to the transition phase and then from the transition phase to the sharing mode phase, duty cycles of signals provided for the first light source 311 gradually decrease, and the luminance of the first light source 311 gradually decreases, so that the abrupt change of the backlight brightness of the backlight source is avoided, and thus the fatigue of the human eyes is improved.

In an implementation, the first light source 311 is always on in the sharing mode phase, the transition phase and the privacy mode phase.

Exemplarily, referring to FIGS. 18 and 19, the backlight source 300 includes a first light guide plate 321 and a second light guide plate 322. The first light source 311 is disposed on a light incidence side of the first light guide plate 321, the second light source 312 is disposed on a light incidence side of the second light guide plate 322, and the second light guide plate 322 is disposed on a light-emitting side of the first light guide plate 321. In the sharing mode phase, the second light source 312 is turned on, and the light emitted by the second light source 312 enters the second light guide plate 322 and is emitted through the light-emitting side of the second light guide plate 322 to serve as the backlight. In the privacy mode phase, the first light source 311 is turned on, the second light source 312 is turned off, and the light emitted by the first light source 311 enters the first light guide plate 321, is emitted into the second light guide plate 322 through the light-emitting side of the first light guide plate 321, and is emitted through the light-emitting side of the second light guide plate 322 to serve as the backlight. In other implementations, the backlight source includes one light guide plate, and the light emitted by the first light source 311 and the second light source 312 may also enter a same light guide plate.

Exemplarily, referring to FIGS. 18 and 19, the light incidence side of the first light guide plate 321 is adjacent to the light-emitting side of the first light guide plate 321, the light incidence side of the second light guide plate 322 is adjacent to the light-emitting side of the second light guide plate 322, and the backlight source 300 is an edge backlight source. In other implementations, the backlight source 300 may also be a direct backlight source.

Figure 24:
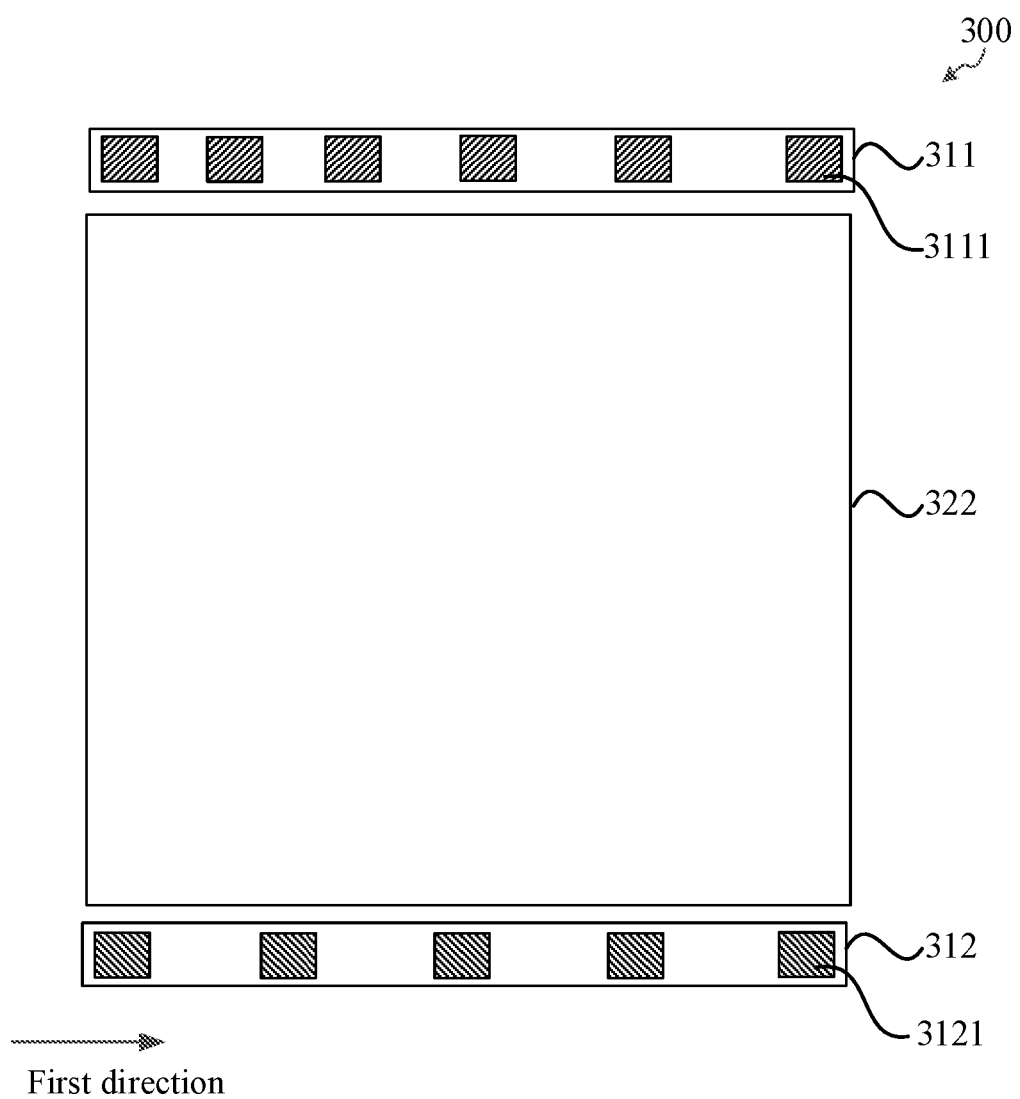
FIG. 24 is a top view of another backlight source according to an embodiment of the present disclosure.

FIG. 24 is a top view of another backlight source according to an embodiment of the present disclosure. In conjunction with FIGS. 9 and 24, the view angle control panel 100 includes a voltage gradient conversion circuit, and the voltage gradient conversion circuit is configured to provide a voltage signal with a reduced gradient for multiple sub-electrodes 121 arranged in a first direction. In the first direction, the rotation angle of the liquid crystal molecule 211 gradually decreases, and the luminance of the view angle control panel 100 is gradually enhanced. The first light source 311 includes multiple first lamp beads 3111, and a distance between adjacent first lamp beads 3111 gradually increases in the first direction. That is, in the first direction, the backlight brightness provided by the first light source 311 gradually decreases to match a trend that the luminance of the view angle control panel 100 gradually increases, so that, in the privacy mode phase, the brightness of a picture displayed by the display device is uniform in each region.

Exemplarily, referring to FIG. 24, the second light source 312 includes multiple second beads 3121. In the first direction, the second lamp beads 3121 are arranged at equal intervals. Namely, every two adjacent second lamp beads 3121 have a same interval, so that the brightness of a picture displayed by the display device is uniform in each region in the sharing mode phase.

In an embodiment, with continued reference to FIG. 19, a surface of a side of the second light guide plate 322 away from the first light guide plate 321 is etched to form multiple microstructures 3221. A relative position of the microstructure 3221 and the first light source 311 is different from a relative position of the microstructure 3221 and the second light source 312. Based on refraction and/or reflection action, the microstructure 3221 is configured to shrink light lays casted by the first light source 311 on the microstructure 3221 and diffuse light lays casted by the second light source 312 on the microstructure 3221.

Figure 25:
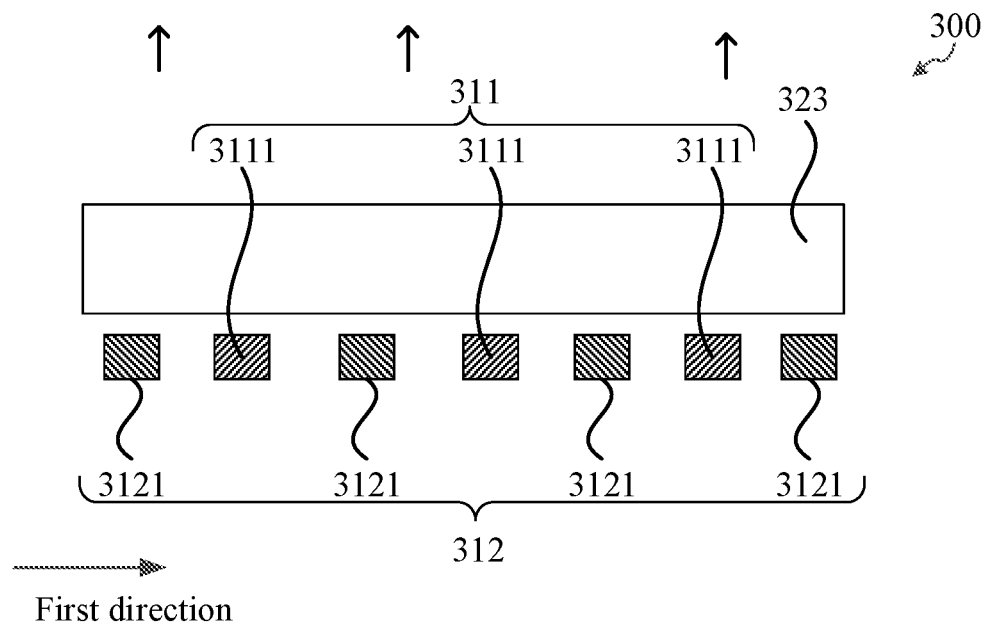
FIG. 25 is a cross-sectional view of another backlight source according to an embodiment of the present disclosure.

FIG. 25 is a cross-sectional view of another backlight source according to an embodiment of the present disclosure. With reference to FIG. 25, the backlight source 300 further includes a third light guide plate 323, both the first light source 311 and the second light source 312 are disposed on the light incidence side of the third light guide plate 323, and the light incidence side of the third light guide plate 323 is opposite to a light-emitting side of the third light guide plate 323. An embodiment of the present disclosure provides a direct backlight source, and the second light source 312 is turned on in the sharing mode phase. In the privacy mode phase, the first light source 311 is turned on and the second light source 312 is turned off. In the transition phase, a voltage signal with gradually changing duty cycles is provided for the second light source 312.

Figure 26:
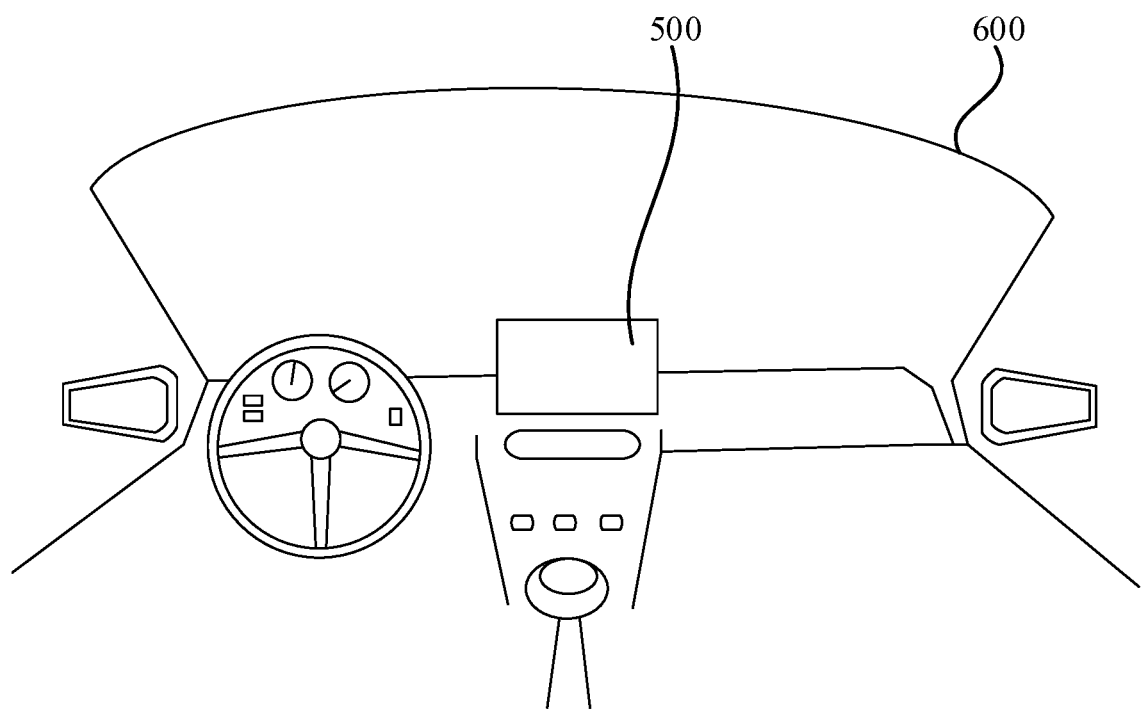
FIG. 26 is a schematic diagram of an automobile according to an embodiment of the present disclosure.

FIG. 26 is a schematic diagram of an automobile according to an embodiment of the present disclosure. With reference to FIG. 26, the automobile includes the display device 500 in the above embodiments, and in some implementations, the display device 500 may include the backlight source 300 in the above embodiments. Thus, the abrupt change of the display brightness of the display device 500 during the switch between the sharing mode phase and the privacy mode phase is avoided, and thus the fatigue of the human eyes is improved.

Exemplarily, referring to FIG. 26, the automobile further includes a co-pilot seat and a windshield 600, and the display device 500 is disposed between the co-pilot seat and the windshield 600. The display device 500 provided in the embodiments of the present disclosure is applied to a vehicle-mounted display. When a co-driver watches some entertainment videos, in order to prevent the influence on a main driver to drive the automobile, it is necessary to make a picture of the display device 500 at a first side view angle (such as a left side view angle) cannot be viewed by the main driver, and a picture at a second side view angle (such as a right side view angle) can be viewed by the co-driver.

It should be noted that the above are merely preferred embodiments of the present disclosure and the technical principles applied herein. It should be understood by those skilled in the art that the present disclosure is not limited to the particular embodiments described herein. For those skilled in the art, various apparent modifications, adaptations, combinations and substitutions may be made without departing from the scope of the present disclosure. Therefore, although the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. A display device, comprising:
a view angle control panel, wherein
the view angle control panel comprises a view angle liquid crystal layer, a first electrode and a second electrode, wherein the view angle liquid crystal layer comprises a liquid crystal molecule, and the liquid crystal molecule is driven to rotate by an electric field generated between the first electrode and the second electrode;
in a sharing mode phase, a same voltage is provided for the first electrode and the second electrode;
in a privacy mode phase, a first voltage is provided for the first electrode, and an alternating voltage signal is provided for the second electrode, wherein a high voltage of the alternating voltage signal is greater than the first voltage, and a low voltage of the alternating voltage signal is less than the first voltage; and
in a transition phase, the first voltage is provided for the first electrode, and a voltage signal with gradually changing duty cycles is provided for the second electrode, wherein the transition phase is located between the sharing mode phase and the privacy mode phase, a duty cycle is a ratio of a time duration occupied by a pulse to a continuous operating time period, and the time duration occupied by the pulse is located within the continuous operating time period and comprises: a first time duration and a second time duration, wherein in the first time duration, a voltage of the pulse is the high voltage of the alternating voltage signal, and in the second time duration, the voltage of the pulse is the low voltage of the alternating voltage signal.

2. The display device of claim 1, wherein in the transition phase during which the sharing mode phase is switched to the privacy mode phase, a voltage signal with gradually increasing duty cycles is provided for the second electrode.

3. The display device of claim 1, wherein in the transition phase during which the privacy mode phase is switched to the sharing mode phase, a voltage signal with gradually decreasing duty cycles is provided for the second electrode.

4. The display device of claim 1, wherein a square wave signal with gradually changing duty cycles is provided for the second electrode in the transition phase.

5. The display device of claim 1, wherein a maintaining duration of the high voltage is equal to a maintaining duration of the low voltage in a same waveform period; and
wherein a duration of each of waveform periods is equal.

6. The display device of claim 1, further comprising: a display panel, wherein the view angle control panel is disposed on a light-emitting display side of the display panel; and
wherein the display panel comprises a liquid crystal display panel, an organic light-emitting display panel, or a micro light-emitting diode display panel.

7. The display device of claim 1, further comprising: a display panel and a backlight source, wherein the backlight source is configured to provide a backlight; and the view angle control panel is disposed between the display panel and the backlight source.

8. The display device of claim 7, wherein the display panel comprises a first display substrate, a second display substrate, and a display liquid crystal layer disposed between the first display substrate and the second display substrate; and
wherein the display device further comprises a touch panel, and the touch panel is disposed between the first display substrate and the second display substrate.

9. The display device of claim 1, wherein the view angle liquid crystal layer further comprises a dye molecule.

10. The display device of claim 1, wherein the second electrode comprises a plurality of sub-electrodes arranged in an array; and the view angle control panel further comprises a voltage gradient conversion circuit, wherein the voltage gradient conversion circuit is configured to provide a voltage signal with a reduced gradient for sub-electrodes arranged in a first direction among the plurality of sub-electrodes; and
wherein the first electrode comprises a plurality of counter sub-electrodes, and the plurality of counter sub-electrodes are disposed opposite to the plurality of sub-electrodes.

11. The display device of claim 1, further comprising: a driver circuit, wherein the driver circuit comprises a comparator, a non-inverting input terminal of the comparator is configure to input a reference voltage, a voltage signal input by an inverting input terminal of the comparator is configure to alternate around the reference voltage, and an output terminal of the comparator is configured to output a voltage signal with gradually changing duty cycles in the transition phase.

12. A backlight source, comprising: a first light source and a second light source, wherein
in a sharing mode phase, the second light source is turned on;
in a privacy mode phase, the first light source is turned on, and the second light source is turned off; and
in a transition phase, a voltage signal with gradually changing duty cycles is provided for the second light source, wherein the transition phase is located between the sharing mode phase and the privacy mode phase, a duty cycle is a ratio of a time duration occupied by a pulse to a continuous operating time period, and the time duration occupied by the pulse is located within the continuous operating time period and comprises: a first time duration and a second time duration, wherein in the first time duration, a voltage of the pulse is a high voltage of an alternating voltage signal, and in the second time duration, the voltage of the pulse is a low voltage of the alternating voltage signal;
wherein in the sharing mode phase, the first light source is turned off; and in the transition phase, a voltage signal with gradually changing duty cycles is provided for the first light source; and
wherein in the transition phase during which the sharing mode phase is switched to the privacy mode phase, a voltage signal with gradually increasing duty cycles is provided for the first light source.

13. The backlight source of claim 12, wherein in the transition phase during which the sharing mode phase is switched to the privacy mode phase, a voltage signal with gradually decreasing duty cycles is provided for the second light source.

14. The backlight source of claim 12, wherein in the transition phase during which the privacy mode phase is switched to the sharing mode phase, a voltage signal with gradually increasing duty cycles is provided for the second light source.

15. The backlight source of claim 12, wherein in the sharing mode phase, the first light source is turned off; and in the transition phase, a voltage signal with gradually changing duty cycles is provided for the first light source; and wherein in the transition phase during which the privacy mode phase is switched to the sharing mode phase, a voltage signal with gradually decreasing duty cycles is provided for the first light source.

16. The backlight source of claim 12, further comprising: a first light guide plate and a second light guide plate, wherein the first light source is disposed on a light incidence side of the first light guide plate, the second light source is disposed on a light incidence side of the second light guide plate, and the second light guide plate is disposed on a light-emitting side of the first light guide plate; and the first light source comprises a plurality of first lamp beads, and a distance between adjacent first lamp beads of the plurality of first lamp beads gradually increases in a first direction; and wherein the second light source comprises a plurality of second lamp beads, wherein the plurality of second lamp beads are arranged at equal intervals in the first direction.

17. The backlight source of claim 16, wherein a surface of a side of the second light guide plate away from the first light guide plate is etched to form a plurality of microstructures, and the plurality of microstructures are configured to shrink light lays casted by the first light source on the plurality of microstructures and diffuse light lays casted by the second light source on the plurality of microstructures.

18. The backlight source of claim 12, further comprising: a third light guide plate, wherein the first light source and the second light source are both disposed on a light incidence side of the third light guide plate, and the light incidence side of the third light guide plate is opposite to a light-emitting side of the third light guide plate.

19. An automobile, comprising: a display device; wherein the display device comprises a view angle control panel, wherein the view angle control panel comprises a view angle liquid crystal layer, first electrode and second electrode, wherein the view angle liquid crystal layer comprises a liquid crystal molecule, and the liquid crystal molecule is driven to rotate by an electric field generated between the first electrode and the second electrode; in a sharing mode phase, a same voltage is provided for the first electrode and the second electrode; in a privacy mode phase, a first voltage is provided for the first electrode, and an alternating voltage signal is provided for the second electrode, wherein a high voltage of the alternating voltage signal is greater than the first voltage, and a low voltage of the alternating voltage signal is less than the first voltage; and in a transition phase, the first voltage is provided for the first electrode, and a voltage signal with gradually changing duty cycles is provided for the second electrode, wherein the transition phase is located between the sharing mode phase and the privacy mode phase, a duty cycle is a ratio of a time duration occupied by a pulse to a continuous operating time period, and the time duration occupied by the pulse located within the continuous operating time period and comprises: a first time duration and a second time duration, wherein in the first time duration, a voltage of the pulse is the high voltage of the alternating voltage signal, and in the second time duration, the voltage of the pulse is the low voltage of the alternating voltage signal; or the display device comprises a backlight source and a liquid crystal display panel, wherein the backlight source comprises a first light source and a second light source, wherein in a sharing mode phase, the second light source is turned on; in a privacy mode phase, the first light source is turned on, and the second light source is turned off; and in a transition phase, a voltage signal with gradually changing duty cycles is provided for the second light source, wherein the transition phase is located between the sharing mode phase and the privacy mode phase, a duty cycle is a ratio of a time duration occupied by a pulse to a continuous operating time period, and the time duration occupied by the pulse is located within the continuous operating time period and comprises: a first time duration and a second time duration, wherein in the first time duration, a voltage of the pulse is a high voltage of an alternating voltage signal, and in the second time duration, the voltage of the pulse is a low voltage of the alternating voltage signal; wherein in the sharing mode phase, the first light source is turned off; and in the transition phase, a voltage signal with gradually changing duty cycles is provided for the first light source; wherein in the transition phase during which the sharing mode phase is switched to the privacy mode phase, a voltage signal with gradually increasing duty cycles is provided for the first light source; and wherein the liquid crystal display panel is disposed on a light-emitting side of the backlight source.

* * * * *